United States Patent
Hernandez Marti et al.

(10) Patent No.: US 9,658,362 B2
(45) Date of Patent: May 23, 2017

(54) PRESSURE EQUALIZED PACKAGING FOR ELECTRONIC SENSORS

(71) Applicant: Schlumberger Technology Corporation, Sugar Land, TX (US)

(72) Inventors: Ramon Hernandez Marti, Houston, TX (US); Bo Chen, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 239 days.

(21) Appl. No.: 14/319,520

(22) Filed: Jun. 30, 2014

(65) Prior Publication Data

US 2015/0000393 A1    Jan. 1, 2015

Related U.S. Application Data

(60) Provisional application No. 61/841,010, filed on Jun. 28, 2013.

(51) Int. Cl.
*G01V 13/00* (2006.01)
*E21B 47/01* (2012.01)
*G01V 11/00* (2006.01)

(52) U.S. Cl.
CPC .......... *G01V 11/002* (2013.01); *E21B 47/011* (2013.01); *G01V 13/00* (2013.01); *Y10T 29/49002* (2015.01)

(58) Field of Classification Search
CPC ...... E21B 47/01; E21B 47/011; E21B 47/013; E21B 47/017; G01V 13/00; G01V 11/002; Y10T 29/49002
See application file for complete search history.

(56) References Cited

U.S. PATENT DOCUMENTS

| | | | |
|---|---|---|---|
| 2010/0051260 A1* | 3/2010 | Vick, Jr. et al. | ...... E21B 47/011 166/151 |
| 2010/0147064 A1* | 6/2010 | DiFoggio | .............. E21B 47/011 73/152.18 |
| 2012/0261139 A1* | 10/2012 | Williamson, Jr. et al. | ....................... E21B 33/10 166/386 |

FOREIGN PATENT DOCUMENTS

WO    2009080603 A1    7/2009

* cited by examiner

*Primary Examiner* — Nguyen Ha
(74) *Attorney, Agent, or Firm* — Michael Dae (57) ABSTRACT

The present disclosure introduces pressure-equalized packaging for electronic sensors utilized in conjunction with downhole tools and/or other extreme environments. Such sensors may be operable to detect, sense, and/or measure a parameter, such as may be associated with the downhole tool, or pressurized fluid in which the downhole tool is at least partially submerged, or a subterranean formation adjacent the downhole tool. A housing couples the sensor to a component of the downhole tool. The housing includes an equalizer operable to substantially equalize a first pressure internal to the housing with a second pressure external to the housing.

10 Claims, 5 Drawing Sheets

PRESSURE EQUALIZED PACKAGING FOR ELECTRONIC SENSORS

CROSS-REFERENCE TO RELATED APPLICATIONS

This application claims priority to and the benefit of U.S. Provisional Patent Application No. 61/841,010, entitled "PRESSURE EQUALIZED PACKAGING FOR MINIATURE ELECTRONIC SENSORS UNDER PRESSURE," filed Jun. 28, 2013, the entire disclosure of which is hereby incorporated herein by reference.

BACKGROUND OF THE DISCLOSURE

Electronic sensors are utilized in various applications to detect and/or measure position, temperature, pressure, and myriad other parameters. Such sensors may be packaged within plastic, ceramic, and/or metallic housings to, for example, protect the sensors from the ambient environment.

In oilfield downhole applications, the ambient environment in which the sensors may be utilized may include extreme pressures, perhaps higher than about 240 MPA, and extreme temperatures, perhaps higher than about 220 degrees C. However, in such environments, the sensor housings may be crushed and/or otherwise damaged, as well as the sensors contained therein.

SUMMARY OF THE DISCLOSURE

The present disclosure introduces an apparatus comprising a downhole tool operable at least partially submersed within a pressurized fluid within a wellbore extending into a subterranean formation. The downhole tool includes a sensor operable to detect, sense, or measure a parameter associated with the downhole tool, the pressurized fluid, or the subterranean formation. The downhole tool also includes a housing coupling the sensor to a component of the downhole tool. The housing includes an equalizer operable to substantially equalize a first pressure internal to the housing with a second pressure external to the housing.

The present disclosure also introduces a method in which a component of a downhole tool is provided. The component and/or the downhole tool are operable at least partially submersed within a pressurized fluid within a wellbore extending into a subterranean formation. A sensor is installed in a housing. The sensor is operable to detect, sense, or measure a parameter associated with the downhole tool, the pressurized fluid, or the subterranean formation. The housing comprises an equalizer operable to substantially equalize a first pressure internal to the housing with a second pressure external to the housing. The housing, and thus the sensor, is coupled to the component of the downhole tool.

The present disclosure also introduces a kit comprising a sensor operable to detect, sense, or measure a parameter associated with a downhole tool, a pressurized fluid in which the downhole tool is at least partially immersed within a wellbore that extends into a subterranean formation, or the subterranean formation. The kit also comprises a housing operable to couple the sensor to a component of the downhole tool. The housing includes an equalizer operable to substantially equalize a first pressure internal to the housing with a second pressure external to the housing.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or implementations disclosed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

One or more aspects of the present disclosure may relate to packaging of sensors utilized for downhole tool applications in oil field services, among other applications, services, and/or other implementations within the scope of the present disclosure. For example, one or more aspects of the present disclosure may relate to pressure-equalized packaging for electronic sensors under pressure for oil field services.

An apparatus introduced in the present disclosure may comprise at least one sensor, which may be operable to measure at least one of a position, a temperature, and a pressure, and a packaging for the at least one sensor in a downhole tool, wherein the sensor is placed within the packaging and the packaging is operable to equalize an outside of the packaging pressure and an inside of the packaging pressure through a frit seal.

In another non-limiting example implementation, the apparatus may further comprise a flexible cover placed over the frit seal to form a flexible volume, wherein the flexible cover is able to expand and contract with variations between the outside of the packaging pressure and the inside of the packaging pressure.

In a further non-limiting example implementation within the scope of the present disclosure, the apparatus may further comprise a fluid in the flexible volume. For example, the fluid may be or comprise oil.

In a further non-limiting example implementation within the scope of the present disclosure, the apparatus may further comprise a bellows and/or other flexible feature, such as may be placed over the frit seal and/or another opening in the housing to form a flexible volume, wherein the bellows and/or other flexible feature may expand and contract with variations between the outside of the packaging pressure and the inside of the packaging pressure.

In a further non-limiting example implementation within the scope of the present disclosure, an apparatus may comprise: a sensor operable for measuring position, temperature, pressure, and/or other parameters, and a packaging for the sensor in a downhole tool, wherein the sensor is placed within the packaging and the packaging may equalize an outside of the packaging pressure and an inside of the packaging pressure through, for example, an opening in a ceramic and/or metallic coating of the packaging. The apparatus may further comprise a flexible cover placed over the opening to form a flexible volume, wherein the flexible cover may expand and contract with variations between the outside of the packaging pressure and the inside of the packaging pressure. The apparatus may also or instead comprise a bellows disposed over the opening to form a flexible volume, wherein the flexible volume may expand and contract with variations between the outside of the packaging pressure and the inside of the packaging pressure. Such apparatus may also or instead comprise a sieve disposed in or otherwise adjacent the opening, such as to sieve materials transporting through the sieve.

One or more aspects of the present disclosure may be described herein in relation to Hall effect sensors, such as for detection of rotor position in a brushless DC motor, although such aspect(s) may also apply or be readily applicable to myriad other example implementations within the scope of the present disclosure. These and/or other aspects may also or instead be applicable or readily adaptable to giant magnetic resistivity (GMR) sensors, temperature sensors, and many other sensors, including those that may comprise and/or be operable in conjunction with a single or multiple electronic chips, such as a sensor and amplifier system, for example.

In an example, non-limiting implementation according to one or more aspects of the present disclosure, three Hall effect sensors may be installed on each of multiple motor-operated seal valves, such as to monitor rotor position. Other implementations are possible, including implementations in which, for example, as many as four to eight valves may be present. These and other implementations may be utilized in environments in which hydrostatic pressure may be about 240 MPa, or higher, and subterranean formation temperature may be about 200 degrees C., or higher, which may result in temperatures at or above about 220 degrees C. at the motors.

At these pressures and/or temperatures, for example, existing cavity packages for sensors may be crushed. However, packaging according to one or more aspects of the present disclosure may withstand such extreme pressures and/or temperatures, and thus provide protection of sensors housed therein.

Existing plastic-encapsulated components are solid, and may thus be exposed to high pressures without causing immediate damage. At high temperatures, however, the gold bonding technique utilized to connect the active chip to the lead frame may become compromised. For example, as the chip contacts are metallized with aluminum, different types of gold/aluminum intermetallic interactions appear at the bond connection. In such instances, the gold/aluminum intermetallic areas may become mechanically weak and/or exhibit a reduced electrical conductivity. The differential thermal expansion rates between the encapsulated plastic and the chip(s) may also create stress on the bond contacts, which may consequently break the weak gold/aluminum intermetallic features. The extreme temperatures may also accelerate the diffusion of aluminum atoms into gold (Kinkerdall voiding), which can consume the thickness of the aluminum pad, thus also potentially contributing to the bond weakness and/or the loss of electrical contact.

Ceramic or metallic packages, however, may admit a larger degree of customization and/or allow using aluminum wire bonding, which may aid in substantially reduced the intermetallic issues. Adding metal layers to the chip terminations, such as in a post-processing step after the chip manufacturing, may also provide a surface compatible with gold bonding without thermal degradation at the price of increased cost. However, the cavity in which the sensor chip is installed may not be sufficiently resistant to extreme pressures.

To address these and/or other issues with existing sensor-packaging options, the present disclosure introduces one or more aspects pertaining to pressure equalization between the environment and the internal device.

Figure 1:
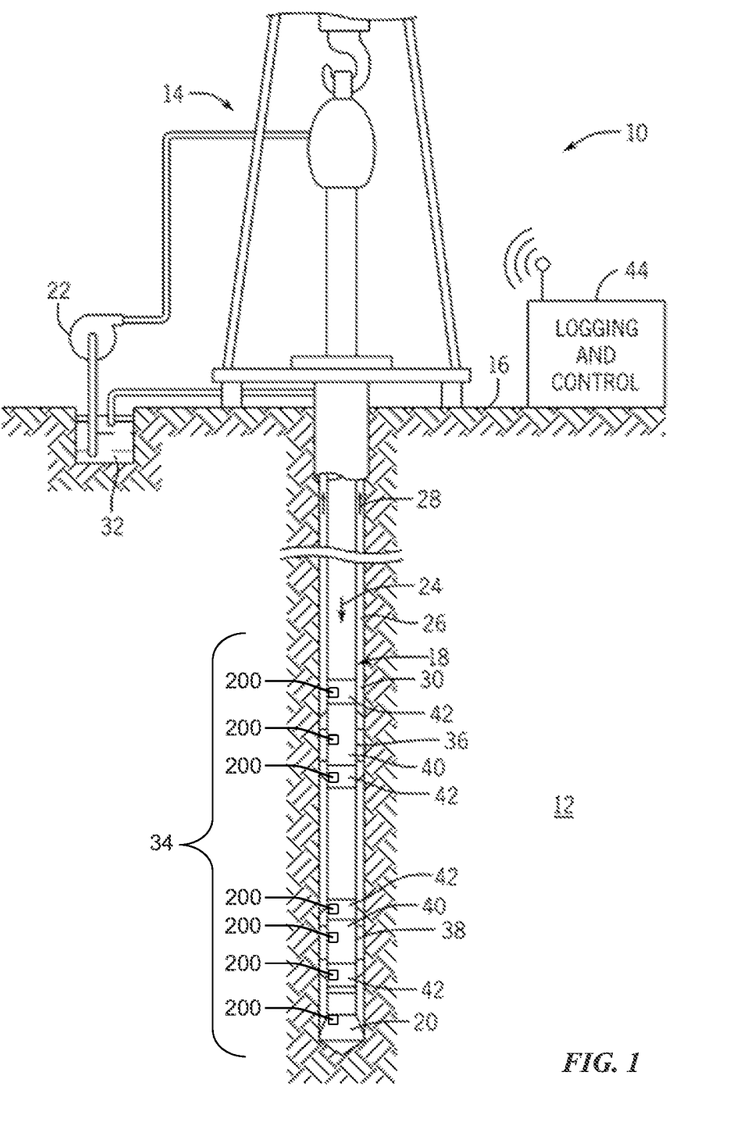
FIG. 1 is a schematic view of at least a portion of apparatus according to one or more aspects of the present disclosure.

FIG. 1 is a schematic view of at least a portion of a drilling system 10 operable to drill a wellbore 26 into one or more subsurface formations 12. A drilling rig 14 at the wellsite surface 16 is operable to rotate a drill string 18 that includes a drill bit 20 at its lower end. As the drill bit 20 is rotated, a pump 22 pumps drilling fluid (commonly referred to as "mud" or "drilling mud") downward through the center of the drill string 18 in the direction of the arrow 24 to the drill bit 20. The mud, which is utilized to cool and lubricate the drill bit 20, exits the drill string 18 through ports (not shown) in the drill bit 20. The mud then carries drill cuttings away from the bottom of the wellbore 26 as it flows back to the wellsite surface 16 through an annulus 30 between the drill string 18 and the formation 12, as shown by the arrows 28. At the wellsite surface 16, the return mud is filtered and conveyed back to a mud pit 32 for reuse.

While a drill string 18 is illustrated in FIG. 1, it will be understood that the embodiments described herein may be applicable or readily adaptable to work strings and wireline tools as well. Work strings may include a length of tubing (e.g., coiled tubing) lowered into the wellbore 26 for conveying well treatments or well servicing equipment. Wireline tools may include formation testing tools suspended from a multi-conductor cable as the cable is lowered into the wellbore 26 to measure formation properties at desired depths. The location and environment of the drilling system 10 may vary widely depending on the formation 12 penetrated by the wellbore 26. Instead of being a surface operation, for example, the wellbore 26 may be formed under water of varying depths, such as on an ocean bottom surface. Certain components of the drilling system 10 may be specially adapted for underwater wells in such instances.

The lower end of the drill string 18 includes a bottom-hole assembly (BHA) 34, which includes the drill bit 20 and a plurality of drill collars 36, 38. The drill collars 36, 38 may include various instruments, such as sample-while-drilling (SWD) tools that include sensors, telemetry equipment, and so forth. For example, the drill collars 36, 38 may include logging-while-drilling (LWD) modules 40 and/or measurement-while drilling (MWD) modules 42. The LWD modules or tools 40 may include tools operable to measure formation parameters and/or fluid properties, such as resistivity, porosity, permeability, sonic velocity, OD, pressure, temperature, and/or others. The MWD modules or tools 42 may include tools operable to measure wellbore trajectory, borehole temperature, borehole pressure, and so forth. The LWD modules 40 may each be housed in one of the drill collars 36, 38, and may each contain one or more logging tools and/or fluid sampling devices. The LWD modules 40 include capabilities for measuring, processing, and/or storing information, as well as for communicating with the MWD modules 42 and/or directly with the surface equipment such as, for example, a logging and control unit 44. That is, the SWD, LWD, and/or MWD apparatus may be communicatively coupled to the logging and control unit 44 disposed at the wellsite surface 16. In other implementations, portions of the logging and control unit 44 may be integrated with downhole features.

The LWD modules 40 and/or the MWD modules 42 may include a downhole formation fluid sampling tool operable to selectively sample fluid from the formation 12. The drilling system 10 may be operable to determine, estimate, or otherwise obtain various properties associated with the sampled formation fluid. These properties may be determined within or communicated to the logging and control unit 44, such as for subsequent utilization as input to various control functions and/or data logs, including as described above to determine the impact of pressure changes on FVF and/or OD.

Figure 2:
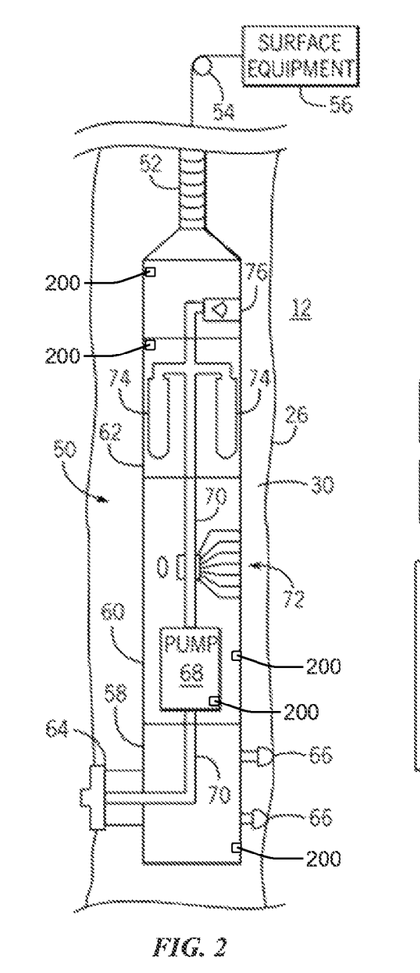
FIG. 2 is a schematic view of at least a portion of apparatus according to one or more aspects of the present disclosure.

FIG. 2 is a schematic diagram of an embodiment of downhole equipment (equipment configured for operation downhole) operable to sample fluid from a formation, such as the formation(s) 12 shown in FIG. 1. Referring to FIGS. 1 and 2, collectively, the downhole equipment includes an example embodiment of a downhole formation fluid sampling tool 50, hereinafter referred to as the downhole tool 50. The downhole tool 50 is conveyable within the wellbore 26 to the subsurface formation 12 and subsequently operable to sample formation fluid from the formation 12. In the example implementation depicted in FIG. 2, the downhole tool 50 is conveyed in the wellbore 26 via a wireline 52. The downhole tool 50 may be suspended in the wellbore 26 from a lower end of the wireline 52, which may be a multiconductor cable spooled from a winch 54. The wireline 52 may be electrically coupled to wellsite surface equipment 56, such as to communicate various control signals and logging information between the downhole tool 50 and the wellsite surface equipment 56. The wellsite surface equipment 56 shown in FIG. 2 and the logging and control unit 44 shown in FIG. 1, or functions thereof, may be integrated in a single system at the wellsite surface 16.

The downhole tool 50 includes a probe module 58, a pumpout module 60, and a sample module 62, one or more of which may comprise, be part of, or be substantially similar to one or more of the SWD tools, LWD modules 40, and/or MWD modules 42 shown in FIG. 1 and/or described above. However, other arrangements and/or modules may make up the downhole tool 50.

The probe module 58 may comprise an extendable fluid communication line (probe 64) operable to engage the formation 12 and communicate fluid samples from the formation 12 into the downhole tool 50. The probe module 58 may also comprise one or more setting mechanisms 66. The setting mechanisms 66 may include pistons and/or other apparatus operable to improve sealing engagement and thus fluid communication between the formation 12 and the probe 64. The probe module 58 may also comprise one or more packer elements (not shown) that inflate or are otherwise operable to contact an inner wall of the wellbore 26, thereby isolating a section of the wellbore 26 for sampling. The probe module 58 may also comprise electronics, batteries, sensors, and/or hydraulic components used, for example, to operate the probe 64 and the corresponding setting mechanisms 66.

The pumpout module 60 may comprise a pump 68 operable to create a pressure differential that draws the formation fluid in through the probe 64 and pushes the fluid through a flowline 70 of the downhole tool 50. The pump 68 may comprise an electromechanical, hydraulic, and/or other type of pump operable to pump formation fluid from the probe module 58 to the sample module 62 and/or out of the downhole tool 50. The pump 68 may operate as a piston displacement unit (DU) driven by a ball screw coupled to a gearbox and an electric motor, although other types of pumps 68 are also within the scope of the present disclosure. Power may be supplied to the pump 68 via other components located in the pumpout module 60, or via a separate power generation module (not shown). During a sampling period, the pump 68 moves the formation fluid through the flowline 70 toward the sample module 62.

The pumpout module 60 may also include a spectrometer 72 operable to measure characteristics of the formation fluid as it flows through the flowline 70. The spectrometer 72 may be located downstream or upstream of the pump 68. The characteristics sensed by the spectrometer 72 may include OD of the formation fluid. Data collected via the spectrometer 72 may be utilized to control the downhole tool 50. For example, the downhole tool 50 may not operate in a sampling mode until the formation fluid flowing through the flowline 70 exhibits characteristics of a clean formation fluid sample, as detected by or otherwise determined in conjunction with operation of the spectrometer 72. A clean formation fluid sample contains a relatively low level of contaminants (e.g., drilling mud filtrate) that are miscible with the formation fluid when extracted from the formation.

The sample module 62 may comprise one or more sample bottles 74 for collecting samples of the formation fluid. Based on the OD and/or other characteristics of the formation fluid detected via sensors (e.g., the spectrometer 72) along the flowline 70, the downhole tool 50 may be operated in a sampling mode or a continuous pumping (cleanup) mode. When operated in the sampling mode, valves (not shown) disposed at or near entrances of the sample bottles 74 may be positioned to allow the formation fluid to flow into the sample bottles 74. The sample bottles 74 may be filled one at a time, and once a sample bottle 74 is filled, its corresponding valve may be moved to another position to seal the sample bottle 74. When the valves are closed, the downhole tool 50 may operate in a continuous pumping mode.

In the continuous pumping mode, the pump 68 moves the formation fluid into the downhole tool 50 through the probe 64, through the flowline 70, and then out of the downhole tool 50 through an exit port 76. The exit port 76 may be a check valve that releases the formation fluid into the annulus 30 of the wellbore 26. The downhole tool 50 may operate in the continuous pumping mode until the formation fluid flowing through the flowline 70 is determined to be clean enough for sampling. That is, when the formation fluid is first sampled, drilling mud filtrate that has been forced into the formation 12 via the drilling operations may enter the downhole tool 50 along with the sampled formation fluid. After pumping the formation fluid for an amount of time, the formation fluid flowing through the downhole tool 50 will provide a cleaner fluid sample of the formation 12 than would otherwise be available when first drawing fluid in through the probe 64. For example, the formation fluid may be considered clean when the OD data from the spectrometer 72 indicates that the formation fluid contains less than approximately 1%, 5%, or 10% filtrate contamination (by volume), although other values are also within the scope of the present disclosure.

The characteristics of the formation fluid measured by the spectrometer 72 may be useful for performing a variety of evaluation and control functions, in addition to determining when the formation fluid flowing through the flowline 70 is clean enough for sampling. For example, data may be collected from the spectrometer 72 and/or other sensors within the downhole tool, such as a density sensor, a viscosity sensor, a pressure sensor, a temperature sensor, and/or a saturation pressure sensor, among others. The collected data may be utilized to estimate a formation volume factor of the contaminated formation fluid, as well as density, optical density, GOR, compressibility, saturation pressure, viscosity, and/or mass fractions of compositional components of the contaminated formation fluid and/or contaminants therein (e.g., OBM filtrate), among others. The collected data may also be utilized to determine, estimate, or otherwise obtain a dependence of OD and/or FVF on downhole pressure.

Figure 3:
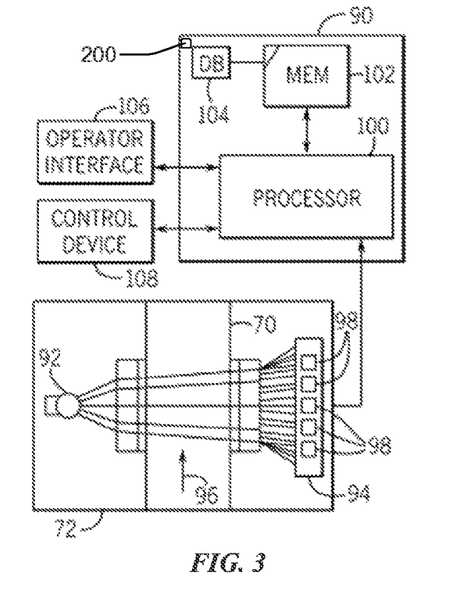
FIG. 3 is a schematic view of at least a portion of apparatus according to one or more aspects of the present disclosure.

FIG. 3 is a schematic diagram of the spectrometer 72 and a control/monitoring system 90 may be utilized to estimate or determine such properties. The spectrometer 72 may comprise a light source 92 and a detector 94 disposed on opposite sides of the flowline 70 through which the formation fluid flows, as indicated by arrow 96. The spectrometer 72 may be part of the downhole tool 50, and may be located at various possible locations along the flowline 70 that directs the formation fluid through the downhole tool 50. Although a single light source 92 is depicted in the example shown in FIG. 3, the spectrometer 72 may include additional light sources 92. The detector 94 may sense the light that passes through the formation fluid in the flowline 70.

The detector 94 may include one or more detector elements 98 that may each be operable to measure the amount of light transmitted at a certain wavelength. For example, the detector elements 98 may detect the light transmitted from the visible to near-infrared within a range of 1, 5, 10, 20, or more different wavelengths ranging between about 400 nm and about 2200 nm. However, other numbers of wavelengths (corresponding to the number of detector elements) and other ranges of wavelengths are also within the scope of the present disclosure. For example, optical characteristics of the formation fluid may be detected at a range of wavelengths, such as the near infrared (NIR) wavelength range of approximately 800-2500 nm, 1500-2050 nm, or 1600-1800 nm. Estimations of formation fluid properties according to one or more aspects of the present disclosure may utilize optical data collected at a single wavelength, at multiple wavelengths, a range of wavelengths, and/or multiple ranges of wavelengths.

The spectrometer 72 may measure one or more optical characteristics of the formation fluid flowing through the flowline 70 and output optical spectra and/or other data representative of the detected optical characteristics. The optical characteristics may include OD of the formation fluid at each of the detected wavelengths and/or wavelength ranges. The OD is a logarithmic measurement relating the intensity of light emitted from the light source 92 to the intensity of light detected by the detector 94 at a certain wavelength or range of wavelengths. Each wavelength or wavelength range may correspond to a compositional component of the formation fluid. For example, each wavelength or wavelength range may pertain to a corresponding one of $CO_2$, $C1$, $C2$, $C3$, $C4$, $C5$, and $C6+$, although other arrangements are also within the scope of the present disclosure.

The spectrometer 72 may send optical spectra and/or other data representative of the measured optical characteristics to a processor 100 of the control/monitoring system 90. In the context of the present disclosure, the term "processor" refers to any number of processor components. The processor 100 may include a single processor disposed onboard the downhole tool 50. In other implementations, at least a portion of the processor 100 (e.g., multiple processors collectively operating as the processor 100) may be located within the wellsite surface equipment 56 of FIG. 2, the logging and control unit 44 of FIG. 1, and/or other surface equipment components. The processor 100 may also or instead be or include one or more processors located within the downhole tool 50 and connected to one or more processors located in drilling and/or other equipment disposed at the wellsite surface 16. Moreover, various combinations of processors may be considered part of the processor 100 in the following discussion. Similar terminology is applied with respect to the control/monitoring system 90 as well as a memory 102 of the control/monitoring system 90, meaning that the control/monitoring system 90 may include various processors communicatively coupled to each other and/or various memories at various locations.

The control/monitoring system 90 may estimate the FVF of the reservoir fluid based on the OD data received from the spectrometer 72, a density sensor, a pressure sensor, a temperature sensor, and/or other sensors, and may utilize the estimated FVF—perhaps including the FVF corrected or adjusted for pressure changes—to determine density, OD, GOR, mass fractions of compositional components, and/or other properties of the reservoir fluid. To make these and other determinations, the processor 100 may execute instructions stored in the memory 102.

The processor 100 may be communicatively coupled with one or more operator interfaces 106 and/or control devices 108. The operator interface 106 may include logs of predicted reservoir fluid properties that are accessible to an operator. The control device 108 may include one or more devices and/or portions thereof that receive control signals for operation based on the estimated properties of the reservoir fluid. Such control devices 108 may implement changes in depth of the downhole tool 50 within the wellbore 26, adjustments to the pumping pressure of the pump 68, and/or other control functions, perhaps based on obtained, calculated, and/or estimated reservoir fluid properties.

Various components depicted in one or more of FIGS. 1-3 and/or otherwise described above may utilize and/or otherwise operate in conjunction with an electronic sensor package (ESP) 200. For example, one or more of the drill bit 20, BHA 34, LWD modules 40, MWD modules 42, downhole tool 50, probe module 58, pumpout module 60, sample module 62, setting mechanisms 66, pump 68, flowline 70, spectrometer 72, sample bottles 74, control/monitoring system 90, light source 92, detector 94, detector elements 98, processor 100, memory 102, and/or other components of the example implementations depicted in one or more of FIGS. 1-3 may utilize, comprise, and/or otherwise operate with or be operated in conjunction with one or more instances of the ESP 200.

Figure 4:
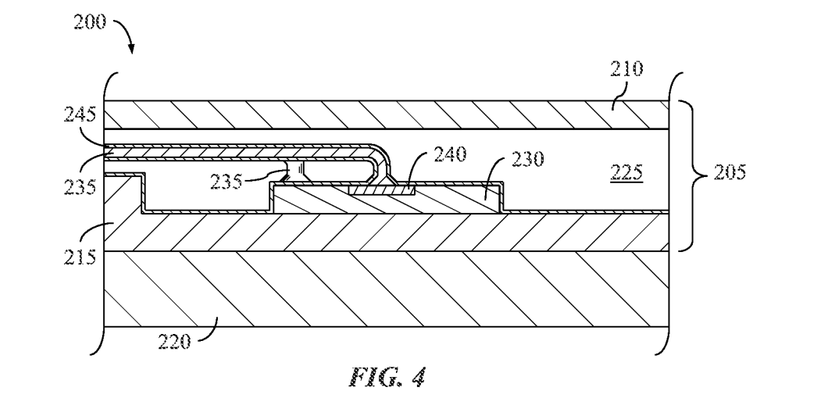
FIG. 4 is a schematic view of at least a portion of apparatus according to one or more aspects of the present disclosure.

FIG. 4 is a sectional view of a portion of an example implementation of the ESP 200 shown in FIGS. 1-3. The ESP 200 comprises a housing 205. The housing 205 comprises a first housing portion 210 and a second housing portion 215. The second housing portion 215 may be utilized to couple the ESP 200 to a component, structure, and/or other feature 220 of a downhole tool, such as the example downhole tools depicted in FIGS. 1-3. The feature 220 may be a pump, piston, actuator, valve, circuit board, chassis, mandrel, collar, and/or other apparatus of the downhole tool. The second housing portion 215 may be coupled to the feature 220 via adhesive, welding, brazing, reflow, solder, interference fit, one or more threaded fasteners, and/or other means (not shown).

The first and second housing portions 210 and 215, respectively, and/or other portions, features, and/or components of the ESP 200, may at least partially define an internal cavity 225 containing one or more sensors 230, which may be or comprise one or more of the sensors described above. In the example implementation depicted in FIG. 4, the one or more sensors 230 are depicted as being implemented as a single integrated circuit (IC) chip, although other implementations within the scope of the present disclosure may entail multiple sensors and/or chips contained within the internal cavity 225. The IC chip embodying the one or more sensors 230 may be coupled to the second housing portion 215 via adhesive, welding, brazing, reflow, solder, interference fit, one or more threaded fasteners, and/or other means (not shown). One or more leads and/or other electrical conductors 235 may be coupled to one or more bond pads 240 of the sensors 230, such as by wire bonding, brazing, soldering, and/or other wire-termination means.

The example implementation of the ESP 200 depicted in FIG. 4 also includes an optional sealant 245 that, at least within the internal cavity 225, may substantially coat the otherwise exposed surfaces of the second housing portion 215, the sensors 230, the electrical conductors 235, and the bond pads 240, among other possible features within the internal cavity 225. The sealant 245 may be or comprise one or more layers of a dielectric, moisture-blocking, chemical-vapor-deposited (CVD) poly(p-xylylene) polymer, such as parylene. However, other or additional materials may be utilized to substantially seal the components and/or features within the internal cavity 225. The sealant 245 may be utilized in each of the example implementations described below, among the myriad other implementations that may fall within the scope of the present disclosure.

Figure 5:
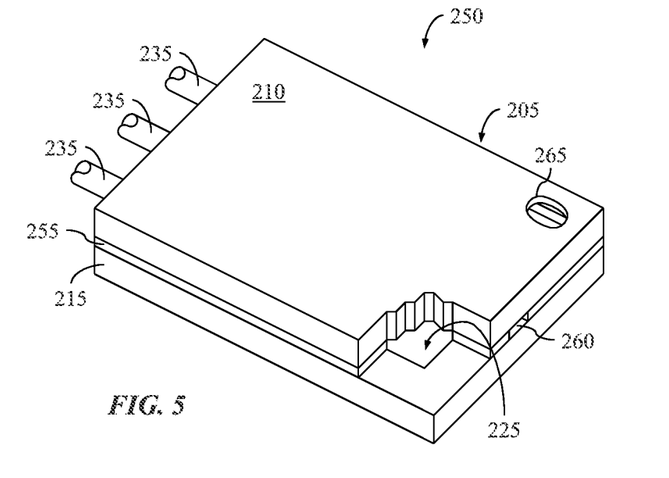
FIG. 5 is a schematic view of at least a portion of apparatus according to one or more aspects of the present disclosure.

FIG. 5 is a schematic view of an example implementation of the ESP 200 shown in FIG. 4, herein designated by reference numeral 250. The housing 205 of the ESP 250 comprises the first and second housing portions 210 and 215, respectively, as depicted in FIG. 4. Three electrical conductors 235 may extend from the housing 205, such as for interconnecting the one or more sensors disposed within the housing (hidden from view in FIG. 5) with other components of the downhole tool (not shown). The first and second housing portions 210 and 215, respectively, may be substantially ceramic in composition, and may be coupled to each other via a sealing material 255. A gap 260 may be left open when forming the sealing material 255 between the first and second housing portions 210 and 215, respectively, or may be created after formation of the sealing material 255, such as by etching, machining, gauging, and/or other means. The gap 260 may extend into and/or fluidly connect the internal cavity (hidden from view) of the ESP 250 with an exterior region surrounding the ESP 250, thus establishing an equalizer by which an internal pressure of the ESP 200 (e.g., the pressure within the internal cavity formed by coupling the first and second housing portions 210 and 215, respectively) may be substantially equalized relative to an external pressure of an ambient environment in which the ESP 200 is disposed (e.g., the downhole environment). The sealing material 255 may substantially be or comprise a glass frit sealing material, such as in implementations in which a seal is made by fusing together metallic powders with a glass binder, for such applications as hermetically sealing ceramic packages for integrated circuits. However, other sealing materials are also within the scope of the present disclosure.

Another equalizer, whether instead of or in addition to the equalizer established by the gap 260 in the sealing material 255, may be established by or as one or more openings 265 extending through an upper (ceiling), lower (floor), side, and/or end wall of one of the first and second housing portions 210 and 215, respectively, and into the internal cavity (hidden from view) of the ESP 250. Such opening(s) 265 may be formed by removing material that forms the first and/or second housing portions 210 and 215, respectively, such as by etching, machining, milling, electric discharge machining (EDM), photolithography, and/or other means. The opening(s) 265 may also or instead be initially formed with the first and/or second housing portions 210 and 215, respectively, such as during one or more casting processes.

Figure 6:
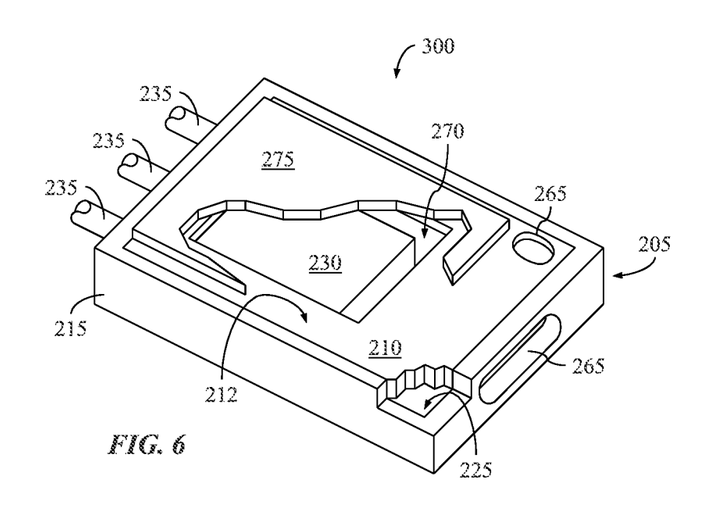
FIG. 6 is a schematic view of at least a portion of apparatus according to one or more aspects of the present disclosure.

FIG. 6 is a schematic view of another example implementation of the ESP 200 shown in FIG. 4, herein designated by reference numeral 300. The housing 205 of the ESP 300 comprises the first and second housing portions 210 and 215, respectively, as depicted in FIG. 4. Three electrical conductors 235 may extend from the housing 205, such as for interconnecting the one or more sensors 230 disposed within the housing 205 with other components of the downhole tool (not shown). The first and second housing portions 210 and 215, respectively, may be substantially metallic in composition, and may be coupled to each other via adhesive, welding, brazing, reflow, solder, interference fit, one or more threaded fasteners, and/or other means (not shown).

An equalizer, by which an internal pressure of the ESP 300 may be substantially equalized relative to an external pressure of an ambient environment in which the ESP 300 is disposed (e.g., the downhole environment), may be established by or as one or more openings 265 extending through an upper (ceiling), lower (floor), side, and/or end wall of one of the first and second housing portions 210 and 215, respectively, and into the internal cavity 225 formed when assembling the first and second housing portions 210 and 215, respectively. The example implementation depicted in FIG. 6 includes an opening 265 extending into the internal cavity 225 through a ceiling wall formed by the first housing portion 210, and another opening 265 extending into the internal cavity 225 through an end wall formed by the second housing portion 215. Such opening(s) 265 may be formed by removing material that forms the first and/or second housing portions 210 and 215, respectively, such as by etching, machining, milling, EDM, photolithography, and/or other means. The opening(s) 265 may also or instead be initially formed with the first and/or second housing portions 210 and 215, respectively, such as during one or more casting processes.

Another equalizer, whether instead of or in addition to the equalizer(s) established by the one or more openings 265 extending into the internal cavity 225 through one or more walls of one or both of the first and second housing portions 210 and 215, respectively, may be established by an opening 270 extending into the internal cavity 225 through a wall of one of the first and second housing portions, wherein such opening 270 may be substantially larger than the openings 265 described above, and wherein such equalizer may further comprise a flexible cover 275 spanning across the opening 270 and sealing against an external surface 212 of the first housing portion 210 around a perimeter of the opening 270. The opening 270, which may also comprise multiple openings covered by the flexible cover 275, may be formed by removing material that forms the first housing portion 210, such as by etching, machining, milling, EDM, photolithography, and/or other means. The opening(s) 270 may also or instead be initially formed with the first housing portion 210, such as during one or more casting processes. The flexible cover 275 may be coupled to the first housing portion 210 via adhesive, welding, brazing, reflow, solder, interference fit, one or more threaded fasteners, and/or other means (not shown). The flexible cover 275 may be or comprise a bellows, a fine metallic mesh, one or more thin (e.g., less than one tenth of a millimeter) metallic layers (perhaps including one or more non-metallic layers), and/or other flexible materials by which the flexible cover 275 may flex in response to a changing pressure differential.

Figure 7:
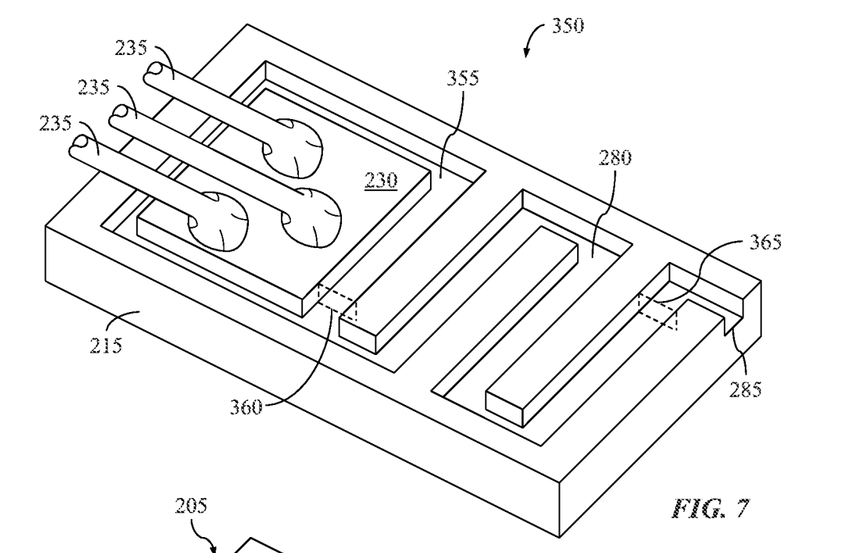
FIG. 7 is a schematic view of at least a portion of apparatus according to one or more aspects of the present disclosure.
Figure 8:
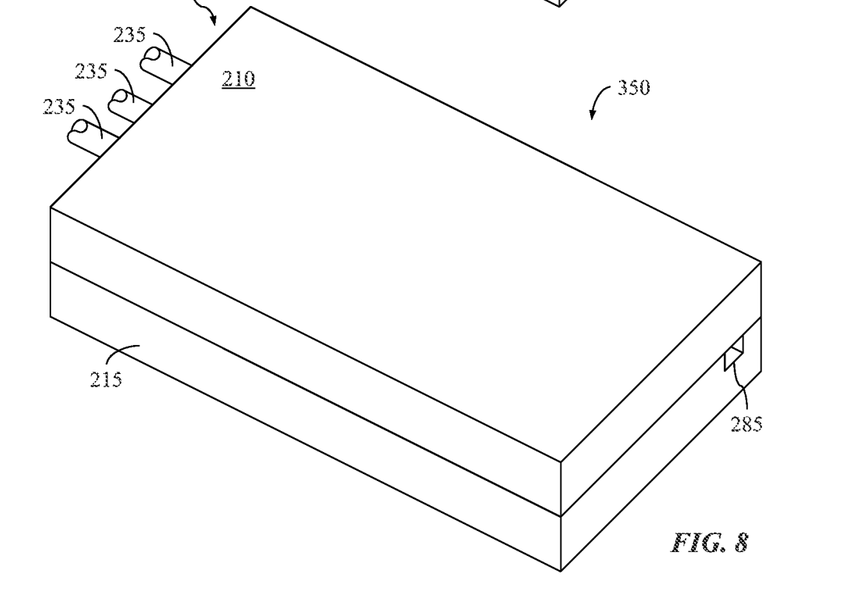
FIG. 8 is a schematic view of at least a portion of apparatus according to one or more aspects of the present disclosure.

FIGS. 7 and 8 are schematic views of another example implementation of the ESP 200 shown in FIG. 4, herein designated by reference numeral 350. The housing 205 of the ESP 350 comprises the first and second housing portions 210 and 215, respectively, as depicted in FIG. 4. However, the first housing portion 210 is not shown in FIG. 7 for the sake of clarity. Three electrical conductors 235 extend from the housing 205, such as for interconnecting the one or more sensors 230 disposed within the internal cavity 205 of the housing 205 with other components of the downhole tool (not shown). The first and second housing portions 210 and 215, respectively, may be substantially ceramic and/or metallic in composition, and may be coupled to each other via adhesive, welding, brazing, reflow, solder, interference fit, one or more threaded fasteners, and/or other means (not shown).

An equalizer, by which an internal pressure of the ESP 350 may be substantially equalized with respect to an external pressure of an ambient environment of the ESP 350, may be established by or as a race 280 extending non-linearly between an exhaust port 285 and a sensor portion 355 of the internal cavity 205 that comprises the sensor(s) 230. The exhaust port 285 may be, comprise, or be substantially similar to one or more of the openings 260 and/or 265 described above. The race 280 may substantially comprise a groove, trough, recess, and/or other void extending in a rectilinear, curved, winding, serpentine, and/or other non-linear manner between the sensor portion 355 of the internal cavity 205 and the exhaust port 285. The volume of the race 280 may be about 75% smaller than the volume of the sensor portion 355 of the internal cavity 205, not including the portion of the internal cavity 205 that is occupied by the sensor(s) 230, the electrical conductor(s) 235, one or more optional layers of sealant (such as the sealant 245 described above with respect to FIG. 4), and/or other objects occupying volume between the first and second housing portions 210 and 215, respectively.

For example, the equalizer established by the total volume of the internal cavity 205 that is defined between the first and second housing portions 210 and 215, respectively, after the sensor(s) 230, electrical conductors (235), and/or other electrical components and/or features have been assembled within the internal cavity 205, may include: the sensor volume 355 substantially surrounding the sensor(s) 230; the race 280 extending between the sensor volume 355 and the exhaust port 285; and a quantity of inert oil, other liquid, or gel (not shown) at least partially occupying the sensor volume 355. For the sake of clarity, the inert oil, other liquid, or gel is not shown in FIG. 7, but may expand and contract between a contracted boundary (an example being approximated by dashed lines 360) and an expanded boundary (an example being approximated by dashed lines 365), depending on the pressure differential acting on the inert oil, other liquid, or gel.

As the pressure outside the ESP 350 decreases, the inert oil, other liquid, or gel that is substantially contained within or near the sensor volume 355 of the internal cavity 205 expands into the race 280, thus creating a pressure equilibrium within the ESP 350. When the external pressure subsequently increases, the inert oil, other liquid, or gel may respond by again contracting in volume, thus receding back towards the sensor volume 355 substantially surrounding the sensor(s) 230.

As the external pressure continues to fluctuate, the inert oil, other liquid, or gel will travel in and out of the race 280 as necessary to equalize the ensuing pressure differential. However, the quantity of the inert oil, other liquid, or gel may be prevented from escaping or spilling out through the exhaust port 285 due to, for example, the action of the capillary forces created by the race 280 and/or the sensor volume 355 in conjunction with the oil, other liquid, and/or gel. In an example of such implementation, the volume of the race 280 may be about 75% less than the sensor volume 355 substantially surrounding the sensor(s) 230 and electrical conductor(s) 235. With a race 280 having a volume of about 25% of the sensor volume 355, an expansion of the inert oil, other liquid, or gel by about 20% may be supported without spilling through the exhaust port 285.

The inert oil, other liquid, or gel may also be utilized with the example implementations depicted in each of FIGS. 4-6, among others within the scope of the present disclosure. That is, equalizers formed by one or more openings fluidly connecting the internal cavity 225 to the ambient environment may be sufficiently effective at equalizing a pressure differential, but such implementations may expose the sensor(s) 230 to the ambient environment, which may compromise functionality of the sensor(s) 230 in some applications. Thus, the internal cavity 225 depicted in each of FIGS. 4-6 may also be at least partially filled with an inert oil, other liquid, or gel, perhaps having an volumetric expansion of not greater than about 20% over the operating range of the downhole tool.

Figure 9:
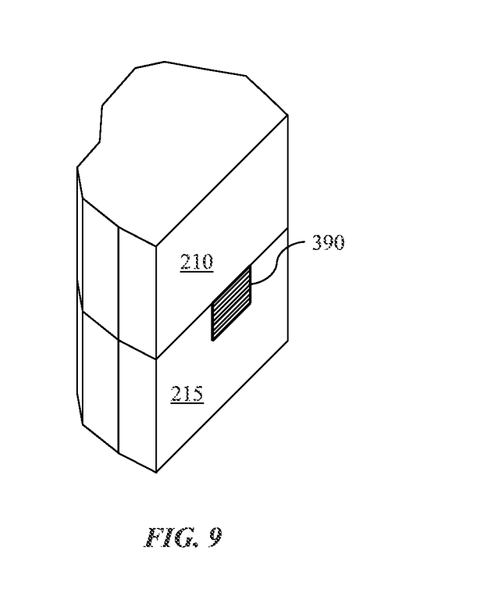
FIG. 9 is a schematic view of at least a portion of apparatus according to one or more aspects of the present disclosure.

FIG. 9 is a schematic view of a portion of an implementation of the ESP 200 shown in FIG. 4, the ESP 250 shown in FIG. 5, the ESP 300 shown in FIG. 6, the ESP 350 shown in FIGS. 7 and 8, and/or other example implementations within the scope of the present disclosure. As depicted in FIG. 9, an opening or exhaust port (such as may lead to the internal cavity 225 described above) may include, be covered by, or otherwise function in conjunction with a sieve 390. The opening or exhaust port may be substantially similar to one or more of the openings 260 and/or 265 described above, and/or the exhaust port 285 described above. The sieve 390 may function to prevent contaminants and/or other particles of a predetermined minimum size from entering the internal cavity. The sieve 390 may be or comprise one or more layers of metallic or other mesh, net, screen, filter, and/or other materials. The sieve 390 may be coupled to one or both of the first and second housing portions 210 and 215, respectively, via adhesive, welding, brazing, reflow, solder, interference fit, one or more threaded fasteners, and/or other means (not shown).

In view of the entirety of the present disclosure, including the figures, a person having ordinary skill in the art should readily recognize that the present disclosure introduces an apparatus comprising: a downhole tool operable at least partially submersed within a pressurized fluid within a wellbore extending into a subterranean formation, wherein the downhole tool comprises: a sensor operable to detect, sense, or measure a parameter associated with the downhole tool, the pressurized fluid, or the subterranean formation; and a housing coupling the sensor to a component of the downhole tool, wherein the housing comprises an equalizer operable to substantially equalize a first pressure internal to the housing with a second pressure external to the housing.

The sensor may be selected from the group consisting of: a position sensor; a temperature sensor; a pressure sensor; and a magnetic field sensor.

The sensor may be operable when the first pressure is less than about 240 MPa. The pressure of the pressurized fluid may be greater than about 240 MPa. The sensor may be operable when a temperature internal to the housing is less than about 220 degrees C. The temperature of the pressurized fluid may be greater than about 220 degrees C.

The sensor may comprise an integrated circuit (IC) chip affixed within the housing. The downhole tool may further comprise an electrical conductor electrically coupled to the IC chip and extending from the housing. The housing may comprise first and second housing portions collectively forming at least a portion of an internal cavity surrounding the IC chip.

The first and second housing portions may each have a substantially ceramic composition. The first and second housing portions may be coupled by a sealing material, and the equalizer may comprise a gap in the sealing material. The sealing material may substantially comprise a glass frit sealing material.

The equalizer may comprise an opening extending through a wall of one of the first and second housing portions. Within the internal cavity, at least one surface of the IC chip, at least one surface of the electrical conductor, and at least one surface of at least one of the first and second housing portions may be each coated with a dielectric, moisture-blocking, chemical-vapor-deposited (CVD) poly (p-xylylene) polymer. At least one of the first and second housing portions may further collectively define: an exhaust port; and a race extending non-linearly between the internal cavity and the exhaust port. The internal cavity may have a first volume, the race may have a second volume, and the second volume may be about 75% smaller than the first volume. The equalizer may comprise: the race; and a quantity of an inert liquid retained within the race via capillary forces. The quantity of inert liquid may exhibit a volumetric expansion not greater than about 20% over an operating range of the downhole tool. The equalizer may comprise: the race; and a quantity of inert gel contained within the race. The quantity of inert gel may exhibit a volumetric expansion not greater than about 20% over an operating range of the downhole tool. The downhole tool may further comprise a sieve operable to prevent the ingress of external contaminants through the exhaust port into the race.

The first and second housing portions may each have a substantially metallic composition. An opening may extend through a wall of one of the first and second housing portions into the internal cavity, and the equalizer may comprise a flexible cover spanning across the opening and sealing against an external surface of the housing around a perimeter of the opening. The internal cavity may contain a quantity of an inert liquid retained within the internal cavity via the flexible cover. The quantity of inert liquid may exhibit a volumetric expansion not greater than about 20% over an operating range of the downhole tool. The internal cavity may contain a quantity of an inert gel retained within the internal cavity via the flexible cover. The quantity of inert gel may exhibit a volumetric expansion not greater than about 20% over an operating range of the downhole tool.

The present disclosure also introduces a method comprising: providing a component of a downhole tool, wherein the component and/or the downhole tool are operable at least partially submersed within a pressurized fluid within a wellbore extending into a subterranean formation; installing a sensor in a housing, wherein the sensor is operable to detect, sense, or measure a parameter associated with the downhole tool, the pressurized fluid, or the subterranean formation, and wherein the housing comprises an equalizer operable to substantially equalize a first pressure internal to the housing with a second pressure external to the housing; and coupling the housing, and thus the sensor, to the component of the downhole tool. The method may further comprise operating the downhole tool when the pressurized fluid has a pressure greater than about 240 MPa and a temperature greater than about 220 degrees C.

The present disclosure also introduces a kit comprising: a sensor operable to detect, sense, or measure a parameter associated with: a downhole tool; a pressurized fluid in which the downhole tool is at least partially immersed within a wellbore that extends into a subterranean formation; or the subterranean formation; and a housing operable to couple the sensor to a component of the downhole tool, wherein the housing comprises an equalizer operable to substantially equalize a first pressure internal to the housing with a second pressure external to the housing. Example implementations of at least portions of such a kit may be as depicted in one or more of FIGS. 4-8, among other examples within the scope of the present disclosure. Example implementations may also include: wherein the sensor is operable when the first pressure is less than about 240 MPa and a temperature internal to the housing is less than about 220 degrees C.; wherein a pressure of the pressurized fluid is greater than about 240 MPa and a temperature of the pressurized fluid is greater than about 220 degrees C.; wherein the sensor comprises an integrated circuit (IC) chip affixed within the housing; wherein the kit further comprises an electrical conductor electrically coupled to the IC chip and extending from the housing; wherein the housing comprises first and second housing portions collectively forming at least a portion of an internal cavity surrounding the IC chip; wherein the first and second housing portions each have either a substantially ceramic composition or a substantially metallic composition; wherein the equalizer comprises an opening fluidly connecting the internal cavity and an ambient environment exterior to the housing; wherein within the internal cavity, at least one surface of the IC chip, at least one surface of the electrical conductor, and at least one surface of at least one of the first and second housing portions are each coated with a dielectric, moisture-blocking, chemical-vapor-deposited (CVD) poly(p-xylylene) polymer; wherein the equalizer comprises a quantity of an inert oil, other liquid, or gel filling a portion of the internal cavity and substantially surrounding the IC chip; wherein the quantity of the inert oil, other liquid, or gel exhibits a volumetric expansion not greater than about 20% over an operating range of the downhole tool; and/or wherein the kit further comprises a sieve operable to prevent the ingress of external contaminants through the opening into the internal cavity.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. An apparatus, comprising:
    a downhole tool operable at least partially submersed within a pressurized fluid within a wellbore extending into a subterranean formation, wherein the downhole tool comprises:
        a sensor operable to detect, sense, or measure a parameter associated with the downhole tool, the pressurized fluid, or the subterranean formation; and
        a housing coupling the sensor to a component of the downhole tool, wherein the housing comprises an equalizer operable to substantially equalize a first pressure internal to the housing with a second pressure external to the housing; and wherein the equalizer comprises an opening fluidly connecting an internal cavity of the housing and an ambient environment exterior to the housing, wherein the housing comprises first and second housing portions collectively forming at least a portion of the internal cavity surrounding the IC chip, wherein, within the internal cavity, at least one surface of the IC chip, at least one surface of an electrical conductor, and at least one surface of at least one of the first and second housing portions are each coated with a dielectric, moisture-blocking, chemical-vapor-deposited (CVD) poly(p-xylylene) polymer.

2. The apparatus of claim 1 wherein the sensor is selected from the group consisting of:
    a position sensor;
    a temperature sensor;
    a pressure sensor; and
    a magnetic field sensor.

3. The apparatus of claim 1 wherein:
    the sensor is operable when the first pressure is less than about 240 MPa;
    a pressure of the pressurized fluid is greater than about 240 MPa;
    the sensor is operable when a temperature internal to the housing is less than about 220 degrees C.; and
    a temperature of the pressurized fluid is greater than about 220 degrees C.

4. The apparatus of claim 1 wherein the sensor comprises an integrated circuit (IC) chip affixed within the housing.

5. The apparatus of claim 1 wherein the opening extends through a wall of one of the first and second housing portions.

6. The apparatus of claim 1 wherein the downhole tool further comprises a sieve operable to prevent the ingress of external contaminants into the internal cavity.

7. The apparatus of claim 1 wherein the first and second housing portions each have a substantially ceramic composition and are coupled by a sealing material, and wherein the equalizer comprises a gap in the sealing material.

8. The apparatus of claim 1 wherein the opening is configured to enable the pressurized fluid to travel in or out of the opening.

9. A kit, comprising:
    a sensor operable to detect, sense, or measure a parameter associated with:
        a downhole tool;
        a pressurized fluid in which the downhole tool is at least partially immersed within a wellbore that extends into a subterranean formation, wherein a pressure of the pressurized fluid is greater than about 240 MPa and a temperature of the pressurized fluid is greater than about 220 degrees C.; or
        the subterranean formation; and
    a housing operable to couple the sensor to a component of the downhole tool, wherein the housing comprises an equalizer operable to substantially equalize a first pressure internal to the housing with a second pressure external to the housing, and wherein the equalizer comprises an opening fluidly connecting an internal cavity of the housing and an ambient environment exterior to the housing, wherein the sensor is operable when the first pressure is less than about 240 MPa and a temperature internal to the housing is less than about 220 degrees C., wherein the sensor comprises an integrated circuit (IC) chip affixed within the housing; the kit further comprises an electrical conductor electrically coupled to the IC chip and extending from the housing; the housing comprises first and second housing portions collectively forming at least a portion of the internal cavity surrounding the IC chip; the first and second housing portions each have either a substantially ceramic composition or a substantially metallic composition, wherein within the internal cavity, at least one surface of the IC chip, at least one surface of the electrical conductor, and at least one surface of at least one of the first and second housing portions are each coated with a dielectric, moisture-blocking, chemical-vapor-deposited (CVD) poly(p-xylylene) polymer; the equalizer comprises a quantity of an inert oil, other liquid, or gel filling a portion of the internal cavity and substantially surrounding the IC chip; the quantity of the inert oil, other liquid, or gel exhibits a volumetric expansion not greater than about 20% over an operating range of the downhole tool; and the kit further comprises a sieve operable to prevent the ingress of external contaminants through the opening into the internal cavity.

10. An apparatus, comprising:
a downhole tool operable at least partially submersed within a pressurized fluid within a wellbore extending into a subterranean formation, wherein the downhole tool comprises:
- a sensor operable to detect, sense, or measure a parameter associated with the downhole tool, the pressurized fluid, or the subterranean formation; and
- a housing coupling the sensor to a component of the downhole tool, wherein the housing comprises an equalizer operable to substantially equalize a first pressure internal to the housing with a second pressure external to the housing; and wherein the equalizer comprises an opening fluidly connecting an internal cavity of the housing and an ambient environment exterior to the housing, wherein the housing comprises first and second housing portions collectively forming at least a portion of the internal cavity surrounding the IC chip, wherein the first and second housing portions each have a substantially ceramic composition and are coupled by a sealing material, and wherein the equalizer comprises a gap in the sealing material.

* * * * *